United States Patent [19]
Nickel et al.

[11] Patent Number: 5,523,111
[45] Date of Patent: Jun. 4, 1996

[54] PROCESS FOR PRODUCTION OF CLATHRATE INCLUSION COMPLEXES

[76] Inventors: Gary B. Nickel, 3124 Assiniboine Ave., Winnipeg, MB, Canada, R3K 0B1; Bernhard Berger, #Box 157, Poplar Point, MB, Canada, R0H 0Z0

[21] Appl. No.: 280,009

[22] Filed: Jul. 25, 1994

[51] Int. Cl.$^6$ ............................................. A23L 1/0522
[52] U.S. Cl. ........................... 426/661; 426/98; 426/519; 426/601; 127/38; 127/69; 252/315.3; 536/107
[58] Field of Search .................................. 426/601, 661, 426/519, 98

[56] References Cited

U.S. PATENT DOCUMENTS 2,876,160  3/1995  Schoch et al. ........................... 426/661

*Primary Examiner*—Helen Pratt
*Attorney, Agent, or Firm*—Dorsey & Whitney

[57] ABSTRACT

A process for the formation of clathrate inclusion complexes comprising suspending a suitable starting material such as acetylated starch in water, heating the resulting suspension past the gelation point of the starting material, cooling the resulting hydrocolloid to just above the convolution temperature of the starting material, cooling the resulting hydrogel while adding a lipid such as a triglyceride and homogenizing the resulting product at a temperature below the melting point of the lipid in the case of fats and 45° C. in the case of oils.

4 Claims, No Drawings

PROCESS FOR PRODUCTION OF CLATHRATE INCLUSION COMPLEXES

TECHNICAL FIELD OF THE INVENTION

This invention relates to a method of producing clathrate inclusion complexes and specifically to producing clathrate inclusion complexes for use as molecular delivery systems.

BACKGROUND OF THE INVENTION

Fats and oils play an important role in the food manufacturing industry. They are a significant component in the taste of foods. They are also integral to the chemistry of food. For example, fats interfere with the development of wheat glutens thereby imparting a shortening effect on the texture of the finished baked product and act to soften the texture of finished baked products.

A difficulty in the use of fats and oils in the food manufacturing industry is that they are not water soluble. Most traditional applications rely on mechanical means to disperse the lipid materials into the food products during the baking process. This mechanical dispersion is inefficient in that the fats and oils are traditionally hydrophobic which may result in inefficiencies in the use of these compounds in food manufacturing, for example in dough systems. Another difficulty in using fats and oil in the food manufacturing industry is that there is a concerted effort underway in society to reduce the fat content of foods.

Attempts have been made to produce commercially viable processes for the formation of stable emulsions that are capable of delivering substances such as fat, without causing retrogradation, lump formation, etc. in food products. U.S. Pat. No. 3,443,990 to Decnop discloses a process related to a cold-water dispersible starch product and a process for producing the same. The process involves mixing a native starch in the form of an aqueous suspension with a mono- or diglyceride. The resulting starch product is readily dispersible in cold water or an aqueous liquid. However, the lipids in the resulting starch are hydrogen bonded to the outside of the starch. Consequently, the product may exhibit retrogradation and extrusion of water because the hydroxyl groups of the starch are located on the outside of the molecule that is formed, thereby allowing hydrogen bonding with other polar hydroxyl groups, which in turn leads to retrogradation and extrusion of water from the final product. In addition, this process does not work with triglycerides alone.

U.S. Pat. No. 1,651,366 to Berthon discloses a process for the preparation of soluble esters of fatty acids from unmodified starch. As with Decnop, above, the lipid is bonded to the outside of the starch.

Accordingly, there is a need in the art for a commercially viable process which forms efficient delivery vehicles for fats and oils into food products. In order to be practical for use in food products, these vehicles should be stable and resistant to retrogradation when used in food products and should provide functionality to allow dispersion into a variety of food products.

SUMMARY OF THE INVENTION

The problems of retrogradation and fat reduction can be solved by the use of highly dispersed clathrate inclusion complexes ("Clathrates"). Clathrates are formed by inclusion of guest molecules in cavities that exist in crystal lattices or are present in large molecules. An interesting aspect of Clathrates is that the guest molecule and the inclusion molecule are not held together by primary valence forces but instead are held by the physical relationship of the molecules. Accordingly, the geometry of the molecules is very important.

The present invention relates to a process for making Clathrates for the delivery of specific molecules, such as fats, oils and related molecules, in foodstuffs. The process produces channel complexes, or clathrates, to disperse the guest molecule in a given foodstuff. A desired starch-based starting material is mixed with water. This mixture is heated past the gelation temperature of the starch-based starting material. The resulting hydrocolloid is cooled to approximately the convolution temperature of the starch-based starting material. A lipid is introduced to the mixture as the resulting hydrogel is cooled to below the convolution temperature of the starch-based starting material. The resulting hydrogel is cooled to below the melting point of a fat and to 45° C. for an oil and homogenized. Upon cooling, the product thus obtained may be packaged for subsequent use.

Use of these Clathrates greatly reduces the amount of fat and/or oil necessary for specific food products. Instead of the fats and oils being present in quantities measured in microns, the fats and oils are present in quantities measured in angstroms. The Clathrates, in effect, provide a molecular encapsulation of the guest molecule. The encapsulation allows for a much improved delivery of fats and oils over traditional methods of using mechanical means. This efficient delivery of oils and fats results in a more intimate mixing over traditional processes, thus accelerating reaction speeds in the food manufacturing industry.

The efficiency of these Clathrates helps to reduce the overall fat content of food products while maintaining the beneficial aspects of the fat. However, the process would be of little use unless the Clathrate dispersions were stable when used in food processing. This process forms Clathrates which are also hydrocolloids, thereby providing a very stable high order of dispersion. In addition, the functionality of the host molecule allows the Clathrate to be easily manipulated to release the guest when desired, i.e., through hydrolysis, heat or enzymatic action.

DETAILED DESCRIPTION OF THE INVENTION

The novel process for making Clathrates described herein involves a process for encapsulating a guest molecule with an inclusion compound. The inclusion compound of the present invention may be a molecular inclusion compound or an inclusion compound of macromolecular substances. It is contemplated that any of a number of these types of compounds that form a channel cavity around the guest compound, including cyclodextrins, cellulose and starch, may be employed. Compounds which form a cage around the guest molecule may also be employed in the present invention. Examples of these compounds are alkyl benzidines, crown ether compounds and clay minerals.

The most preferred channel forming inclusion compound is a starch modified specifically to be able to form Clathrates. In a Clathrate, amylose assumes a helix configuration. In contrast, compounds such as Cyclodextrins form ring or torus configurations. Each turn of the helix consists of seven gluconomer links which are connected by 1–4 alphaglucosidic links. Accordingly, both amylose and the long chain links of amylopectin may be effectively utilized in the present process because their chains contain more than seven gluconomer units.

Of the two configurations, the helix configuration is preferred. The ring configuration, when coupled with a guest, tends to be hydrophobic, thereby having a tendency to precipitate from the hydrocolloidal state. In contrast, the outside of the helix molecules is very hydrophilic. The hydrophilic groups surround and overcome the hydrophobic characteristics of the guests. The Clathrates of a suitably modified amylose will not precipitate out of the hydrocolloidal state or agglomerate because of the hydrophobicity of the guests. Accordingly, these helices provide an excellent vehicle for the delivery of fats and oils because of their propensity towards remaining in the hydrocolloidal state.

The amylose may be obtained from numerous sources, including peas, corn (including high amylose corn containing 55–80% amylose), potatoes and beans. It is preferred that the starting material have an amylose content of at least 10% by weight. In addition, it is desirable that the starch be acetylated to a degree of substitution of acetyl groups of between 0.05 and 0.15 because a starch modified in this manner does not retrograde and thus is an excellent inclusion molecule. Starch that has been acetylated in this manner is readily available from Woodstone Foods Corporation of Winnipeg, Manitoba, Canada, under the tradename STILL-WATER™ powder.

A uniformly acylated starch molecule is desired because it ties up the preferential hydrogen bridge bonding sites on the starch. This prevents retrogradation of the starch, thereby preventing agglomeration, which in turn decreases the order of magnitude of the dispersion. Accordingly, a very stable dispersion is formed.

In addition, it is important to have an inclusion molecule of predictable geometry. The uniformly acylated starch, having a degree of substitution of between 0.05 and 0.15, provides such a starch product. Amylose that has been modified in this manner resists retrogradation to a much greater extent than non-uniformly acylated starch, particularly because of intra- and inter-hydrogen bonding of the starch is prohibited.

The starch may be modified with any of a number of acyl groups for use in food and non-food related products. Such groups include formyl, acetyl, propionyl and benzoyl groups. For food related products, acetyl modification is most preferred.

Many lipid substances may be used as the guest molecule. Of course, the guest molecule will vary depending on the food into which the lipids are to be delivered. Accordingly, mono- and diglycerides and their fatty acids and triglycerides and their hydrogenated forms may be used. However, it is contemplated that other lipids such as waxes, steroids, phospholipids, glycolipids and sphingolipids may be encapsulated within the inclusion molecule for delivery in systems other than food products.

Several fatty acids and their mono or diglycerides may be used in the present invention. These may be unsaturated or saturated. Suitable guests include, but are not limited to, fatty acids (and their mono and diglycerides) containing between 12 and 24 carbon atoms with palmitic, margaric, stearic, arachidic, palmitoleic, olei, linoleic and linolenic acids being preferred.

Suitable triglycerides include most vegetable oils including corn and soybean oils as well as butterfat, lard oil, beef tallow, cocoa butter, coconut oil, cottonseed oil, linseed oil, mustard oil, olive oil, palm oil, palm kernel oil, peanut oil, rapeseed oil, safflower oil, sesame oil, sunflower oil and wheat germ oil. The preferred triglyceride will depend on the food product being made. The hydrogenated form of the triglyceride may also be used.

To perform the process, the starch-based starting material is suspended in an aqueous medium. The percentage, by weight, of the starting material will vary according to the specific application. The suspension is heated past the gelation point of the starting material. Once heated past its gelation temperature, the amylose in the starting material will be fully uncoiled. The resulting hydrocolloid is cooled to a point just above the convolution temperature of the starting material. At this point, the starting material has begun to coil, but is not fully coiled. The desired lipid is added as the hydrocolloid is cooled below the convolution temperature of the starch-based starting material. Below the convolution temperature of the starting material and above the melting point of the lipid, Clathrate formation is induced. The resulting hydrogel is homogenized below the melting point of the lipid in the case of a fat and to approximately 45° C. in the case of an oil in a jet or shear homogenizer and stored.

The medium may be acidified. If the medium is acidified, heating past the gelation temperature will cause hydrolysis. After heating to past the gelation temperature, the hydrocolloid is neutralized, if necessary, with sodium hydroxide and/or sodium carbonate. This hydrolysis facilitate the production of end products that are easily meltable, such as ingredients for cheese and ice creams.

If the lipid is added too early in the process, two distinct phases result; a hydrogel and an oil. These phases will remain apparent through the homogenization step. Upon cooling, Clathrate formation will occur. However, if homogenization occurs before Clathrate formation, the desired texture for the finished product will not likely be obtained.

In a preferred embodiment the starch-based starting material is an acetylated amylose, having a degree of acetyl substitution of between 0.10 and 0.11. If the amylose is obtained from starch, a suspension of approximately 8% by weight starch, containing approximately 30–35% by weight of amylose is prepared by mixing the starch with water. This suspension is heated to 85° C. and held for one to two minutes. At this stage in the process, the amylose has completely uncoiled and lost all indicia of crystalinity. The resulting hydrocolloid is cooled to 65° C., a point just above the convolution temperature of the amylose. A desired lipid, such as a fat, is added to the hydrogel as the mixture is agitated. While agitation is maintained, the resulting hydrogel is further cooled to below the melting point of the fat and homogenized. During this cooling stage, before the temperature reaches the melting point of the fat, Clathrate formation is induced. The resulting product may be further cooled and packaged for subsequent use. Alternatively, the mixture may be isolated by precipitating with a non-solvent and centrifuging and drying.

Amylopectin can act as a suitable host molecule in the present invention. In fact, it has been determined that amylopectin chains of certain starches have a relatively high fat binding capability when used as host molecules in the present invention. In support of this finding, uniformly acetylated pea starch, having a degree of substitution of approximately 0.10 was fractionated, using the Muetgert precipitation process (which separates amylose and amylopectin). Clathrates of each fraction with cottonseed oil were prepared and compared. It was found that the amylopectin fraction accounted for one third of the fat binding capability. In fact, the amylopectin accounted for one third the fat binding capability of the pea starch, a surprisingly high number. Because of this binding capability, amylose need not be isolated before being used in the method.

The resistance to agglomeration was measured by a comparison of native starches and modified high amylose starches. Clathrates separately containing corn, tapioca, rice, pea, potato and mung bean starch were created with cottonseed oil and stored for 24 hours at between 0° C. and 4° C. All but the modified high amylose starches, and to a lesser extend potato starch, exhibited excessive retrogradation and agglomeration.

The following examples illustrate the present invention.

EXAMPLE I 6.8 kilograms of acetylated starch, having the tradename STILL-WATER® powder and having a degree of acetyl substitution of between 0.10 and 0.11, were mixed with 1.4 kilograms of skim milk solids and 67.8 liters of tap water in a votator style scraped surface heat exchanger. This mixture was slurried in the heat exchanger and heated to 85° C. for one to two minutes. This mixture was cooled to 65° C. Separately, canola oil and distilled monoglyceride were melted together in a steam-jacketed container (with mild agitation). The combined lipids were mixed into the starch gel while cooling the gel to 55° C. The gel was further cooled and homogenized below 50° C. and packaged.

It is important to note that the starch material must be thoroughly heated to at least 85° C.

The resulting product may be used as a shortening to provide a traditional short fat texture to the product. By using this product, the fat content may be significantly reduced. For example, traditional flour tortillas normally contain 8% to 11% of fat as shortening based on flour content. By using this invention, that shortening material can be replaced by as little as 3.5% of this reduced fat product, thereby lowering the fat content by a factor of ten. Furthermore, because the lipids are so even dispersed in the tortilla, the mouthfeel is improved even though the fat content has been significantly reduced.

A comparison of tortilla formulation using traditional shortening versus shortening in combination with the Clathrate complex is set forth below:

|  | Traditional Tortilla Formulation (In lbs.) | Clathrate Fat Complex Formulation (In lbs.) |
| --- | --- | --- |
| Water | 51 | 51 |
| Flour | 100 | 100 |
| Shortening | 10 | 0 |
| Clathrate Fat Complex | 0 | 4 |
| Salt | 2 | 2 |
| Baking Powder | 2 | 2 |
| Fumaric Acid | 0.33 | 0.33 |
| Calcium Propionate | 0.75 | 0.75 |
| Total Fat Added (Lbs.) | 10 | 0.96 |

The product thus obtained will release its lipid guest gradually as the product is heated. In the tortilla making process, some of the lipid will be available in the cold mixing stage and as the baking process continues to heat, the amylose begin to uncoil and will gradually release more of the lipid guest.

EXAMPLE II 6.4 kilograms of acetylated starch, having the tradename STILL-WATER® powder and having a degree of substitution of acetyl groups of approximately 0.10 was mixed with 63.6 liters of water in a scraped surface kettle. This mixture was slurried in the kettle and heated to 85° C. for one to two minutes. Thereafter, the mixture was cooled to 65° C. and 30 kilograms of butter was blended into the gel while it was cooled to 35° C. The lipid was homogenized below 35° C. in a shear homogenizer. Once the product had cooled to 10° C., it was packaged.

This Clathrate is useful in ice cream because most low fat ice creams suffer from inferior mouthfeel due to the lack of fats. The traditional approach is to substitute the slippery texture of gums and other traditional hydrocolloids to replace the missing mouthfeel of the fats. These replacement systems do not accurately replace the fatty mouthfeel of full fat ice creams.

The Clathrate is butter oil molecularly dispersed in an hydrocolloid that provides a mimic to the sliming characteristics of traditional fats. Use of this Clathrate allows the maker to reduce the typically 15 to 18% butterfat content of premium ice cream to approximately 2.2% to provide an ice cream with similar eating qualifies yet much less fat.

EXAMPLE III

Mix 8.2 kilograms of acetylated starch with 66.6 liters of acetylated starch in a scraped surface kettle. Slurry this mixture in the kettle and heat to 85° C. for one to two minutes. Cool the mixture to 65° C. Blend in 25.2 grams of vanillin while agitating and cooling to 55° C.

The resulting gel may be spray-dried to produce a powder in which the vanillin essentially encapsulates the Clathrate. This type of application increases the residual level of the vanillin after baking because the Clathrate slows the rate of volatility of the vanillin.

As will be recognized by those skilled in the art, variations may be made in ingredients, proportions and procedures as long as such variations are within the scope and spirit of the following claims.

We claim:

1. A process for making clathrate inclusion complexes, comprising:

a) suspending a uniformly acetylated starch, having an amylose content of at least 30% and having a degree of substitution of acetyl groups of between 0.05 and 0.15, in an aqueous medium;

b) heating the suspension past the gelation temperature of the starch to form a hydrocolloid;

c) cooling the hydrocolloid to a point above the temperature where the starch is not fully coiled to form a hydrogel;

d) adding a desired lipid while cooling the hydrogel; and e) homogenizing the resulting clathrate complex.

2. The process of claim 1 wherein the lipid is consisting of monoglycerides, diglycerides and triglycerides.

3. The process of claim 1 wherein the lipid is a triglyceride.

4. A process for making a clathrate inclusion complex between a uniformly acetylated starch containing at least 30% amylose and having a degree of substitution of acetyl groups of between 0.05 and 0.15 and a lipid, comprising:

a) suspending the acetylated amylose in an aqueous solution;

b) heating the solution to approximately 85° C. to form a hydrocolloid;

c) cooling the suspension to approximately 65° C.;

d) adding a lipid to the hydrocolloid while cooling the hydrocolloid to approximately 55° C. to form a hydrogel; and e) homogenizing the resulting hydrogel.

* * * * *